US012691574B2

(12) United States Patent
Tebyani et al.

(10) Patent No.: US 12,691,574 B2
(45) Date of Patent: Jul. 28, 2026

(54) MULTI-MATERIAL, FLEXIBLE ROBOTIC ASSEMBLY WITH INTERLOCKING AND ELASTIC CABLES, EMBEDDED SENSORS, AND ACTUATORS

(71) Applicant: The Regents of the University of California, Oakland, CA (US)

(72) Inventors: Maryam Tebyani, Santa Cruz, CA (US); Mircea Teodorescu, Santa Cruz, CA (US); Zoe Levin, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 18/857,570

(22) PCT Filed: Apr. 26, 2023

(86) PCT No.: PCT/US2023/019915
§ 371 (c)(1),
(2) Date: Oct. 17, 2024

(87) PCT Pub. No.: WO2023/212009
PCT Pub. Date: Nov. 2, 2023

(65) Prior Publication Data
US 2025/0262757 A1 Aug. 21, 2025

Related U.S. Application Data

(60) Provisional application No. 63/335,765, filed on Apr. 28, 2022.

(51) Int. Cl.
*B33Y 30/00* (2015.01)
*B25J 9/10* (2006.01)
(Continued)

(52) U.S. Cl.
CPC ............... *B25J 9/104* (2013.01); *B33Y 50/00* (2014.12); *B33Y 80/00* (2014.12)

(58) Field of Classification Search
CPC ........... B25J 9/104; B33Y 50/00; B33Y 80/00
See application file for complete search history.

(56) References Cited

U.S. PATENT DOCUMENTS 10,571,642 B1 * 2/2020 Cohen .................... B33Y 70/10
2015/0366113 A1 12/2015 Sreetharan
(Continued)

FOREIGN PATENT DOCUMENTS

WO 2017200991 A2 11/2017
WO 2022013469 A1 1/2022

OTHER PUBLICATIONS

International Search Report and Written Opinion of the International Searching Authority issued in corresponding application PCT/US2023/019915 mailed Jul. 20, 2023 (8 pages).
(Continued)

*Primary Examiner* — Randell J Krug
(74) *Attorney, Agent, or Firm* — Carter, DeLuca & Farrell LLP; Vadim Vapnyar

(57) ABSTRACT

A robotic assembly includes a plurality of rigid links formed from a first material and an elastic joint interconnecting a pair of rigid links of the plurality of rigid links. The elastic joint is formed from a second material. The robotic assembly also includes a conductive sensor coupled to the elastic joint and extending along at least one rigid link of the plurality of rigid links. The conductive sensor is formed from a third material. The plurality of rigid links, the elastic joint, and the conductive sensor are formed during a single printing process by a multi-material printer.

20 Claims, 4 Drawing Sheets

(51) Int. Cl.
B33Y 50/00 (2015.01)
B33Y 80/00 (2015.01)

(56) References Cited

U.S. PATENT DOCUMENTS

| | | | |
|---|---|---|---|
| 2017/0259509 A1 | 9/2017 | Chang et al. | |
| 2019/0030710 A1 | 1/2019 | Lessing et al. | |
| 2020/0156237 A1 | 5/2020 | Tang et al. | |
| 2020/0315429 A1* | 10/2020 | Russo | A61M 25/0155 |

OTHER PUBLICATIONS

J. A. Beltran-Fernandez, I. A. A. Hernandez, I. Bantle-Chavez, C. Alvarado-Moreno, L. H. Hernandez-Gomez, P. Moreno-Garibaldi, N. P. Chipol, J. C. H. Ochoa, A. L. Lievano, and G. M. Urriolagoitia-Calderon, "Manufacturing of a Human's Hand Prosthesis with Electronic Movable Phalanges Based on a CT Image: An Amputation Case", pp. 355-396. Cham: Springer International Publishing, 2020.

J. Apostolakos, T. J. Durant, C. R. Dwyer, R. P. Russell, J. H. Weinreb, F. Alaee, K. Beitzel, M. B. Mccarthy, M. P. Cote, and A. D. Mazzocca, "The enthesis: a review of the tendon-to-bone insertion," Muscles, ligaments and tendons journal, vol. 4, No. 3, p. 333, 2014.

C. Melchiorri, G. Palli, G. Berselli, and G. Vassura, "Development of the UB Hand IV: Overview of design solutions and enabling technologies," IEEE Robotics Automation Magazine, vol. 20, pp. 72-81, Sep. 2013.

D. D. Wilkinson, M. V. Weghe, and Y. Matsuoka, "An extensor mechanism for an anatomical robotic hand," in 2003 IEEE International Conference on Robotics and Automation (Cat. No.03CH37422), vol. 1, pp. 238-243 vol. 1, Sep. 2003.

D. Sangian, A. Jeiranikhameneh, S. Naficy, S. Beirne, and G. Spinks, "Three-dimensional printed braided sleeves for manufacturing mckibben artificial muscles," 3D Printing and Additive Manufacturing, vol. 6, 11 2018.

E. N. Kubiak, J. A. Klugman, and J. A. Bosco, "Hand injuries in rock climbers," Bulletin-Hospital for Joint Diseases New York, vol. 64, No. 3/4, p. 172, 2006.

E. Q. Pang and J. Yao, "Anatomy and biomechanics of the finger proximal interphalangeal joint," Hand Clinics, vol. 34, No. 2, pp. 121-126, 2018. Current Concepts in the Management of Proximal Interphalangeal Joint Disorders.

E. Todorov, T. Erez, and Y. Tassa, "Mujoco: A physics engine for model-based control," in 2012 IEEE/RSJ International Conference on Intelligent Robots and Systems, pp. 5026-5033, IEEE, 2012.

G. Dammer, S. Gablenz, A. Hildebrandt, and Z. Major, "Polyjet-printed bellows actuators: Design, structural optimization, and experimental investigation," Frontiers in Robotics and AI, vol. 6, p. 34, 2019.

J. A. E. Hughes, P. Maiolino, and F. lida, "An anthropomorphic soft skeleton hand exploiting conditional models for piano playing," Science Robotics, vol. 3, No. 25, 2018.

L. Rozmaryn, "The collateral ligament of the digits of the hand: Anatomy, physiology, biomechanics, injury, and treatment," The Journal of Hand Surgery, vol. 42, pp. 904-915, 11 2017.

L. Tian, N. Magnenat Thalmann, D. Thalmann, and J. Zheng, "The making of a 3d-printed, cable-driven, single-model, lightweight humanoid robotic hand," Frontiers in Robotics and AI, vol. 4, p. 65, 2017.

M. A. Bohl, C. D. Morgan, M. A. Mooney, G. J. Repp, J. N. Lehrman, B. P. Kelly, S. W. Chang, J. D. Turner, and U. K. Kakarla, "Biomechanical testing of a 3d-printed L5 vertebral body model," Cureus, vol. 11, No. 1, 2019.

M. A. Bohl, M. A. Mooney, G. J. Repp, P. Nakaji, S. W. Chang, J. D. Turner, and U. K. Kakarla, "The barrow biomimetic spine: fluoroscopic analysis of a synthetic spine model made of variable 3d-printed materials and print parameters," Spine, vol. 43, No. 23, pp. E1368-E1375, 2018.

S. Arabnejad, B. Johnston, M. Tanzer, and D. Pasini, "Fully porous 3d printed titanium femoral stem to reduce stress-shielding following total hip arthroplasty," Journal of Orthopaedic Research, vol. 35, No. 8, pp. 1774-1783, 2017.

W. W. Peterson, P. R. Manske, B. A. Bollinger, P. A. Lesker, and J. A. McCarthy, "Effect of pulley excision on flexor tendon biomechanics," Journal of Orthopaedic Research, vol. 4, No. 1, pp. 96-101, 1986.

Z. Xu, V. Kumar, Y. Matsuoka, and E. Todorov, "Design of an anthropomorphic robotic finger system with biomimetic artificial joints," in 2012 4th IEEE Ras Embs International Conference on Biomedical Robotics and Biomechatronics (BioRob), pp. 568-574, Jun. 2012.

* cited by examiner

100 — Design rigid links

102 — Design elastic joints and pulleys

104 — Design cable attached to distal link

106 — Design conductive traces

108 — Generate design file

110 — Load three different materials into printer

112 — Perform print job at the printer

114 — Postproduction of robotic assembly

116 — Connect robotic assembly to actuator(s) and sensor reader

MULTI-MATERIAL, FLEXIBLE ROBOTIC ASSEMBLY WITH INTERLOCKING AND ELASTIC CABLES, EMBEDDED SENSORS, AND ACTUATORS

CROSS REFERENCE TO RELATED APPLICATIONS

This application is a U.S. National Stage Application filed under 35 U.S.C. § 371 (a) of International Patent Application No. PCT/US2023/019915, filed Apr. 26, 2023, which claims the benefit of and priority to U.S. Provisional Patent Application Ser. No. 63/335,765 filed Apr. 28, 2022, the entire contents of the foregoing applications are incorporated by reference herein.

BACKGROUND

Humans can actively and passively articulate their endoskeletal structure, a feat enabled by the ligaments and tendons that elastically connect the relatively rigid bone structure. Combined with internal musculature, this allows the body to be both compliant and load bearing. Cable-driven robotic hands have been particularly successful in replicating the motion and behavior of human hands through elaborate designs which approximate the tendons and ligaments. Creating these biomimetic robots typically consists of a design, fabrication, and assembly phase. The fabrication process may include integrating 3D printed parts and miscellaneous elements, like fasteners or wires, to anchor the cables required to articulate the links. This assembly can be tedious and highlights the need for a simple way to interface the links and cables which comprise these robotic platforms. This design methodology can lead to a tradeoff between mechanical simplicity and ease of fabrication for cable-driven robots. While human anatomy imposes physical limitations, robotic technologies often fall short in capturing the full range of capabilities offered by the human hand. This may be a result of lost complexity in most robotic designs. The proximal interphalangeal joint has been shown to have motion in the axial, coronal and sagittal planes. Under-actuated joints enable robust behavior and using traditional joints to achieve comparable motion can require advanced control techniques.

The typical design process for creating a cable-driven robot typically includes assembling multiple parts, such as, cables, pulleys, custom parts (e.g., 3D modeled/printed links and mounts). These parts need to be fabricated and tediously assembled, which includes cutting cables to length, mounting pulleys, and tying thin cables to attachment points along the links. In parallel, off-the-shelf sensing components like flex or pressure sensors are integrated at varied points throughout the fabrication and assembly process. Thus, there is a need for streamlined methods that allow a roboticist to 3D model all of these features and/or 3D print the robot as a single part which includes: 1) the links 2) the joints, 3) the cables, 4) the sensors, 5) the actuators, etc. This shifts the work that requires engineering expertise to the design phase, allowing complex designs to be realized through a multi-material fabricator.

SUMMARY

The disclosure provides a novel design and fabrication process that solves the interface problem inherent in building robots—how to easily connect robotic links, joints, cables, sensors, and actuators. The elastic joints and cables, along with the integrated sensing allow for design and construction of bio-inspired and highly biomimetic robotic models with cable-driven systems found in biological systems, such as the musculoskeletal structure of mammals. Such biological systems feature joints with high degrees of freedom, elastic tendons, proprioception, and a sense of touch, that would be time-consuming or impossible to recreate with other robotic fabrication methods.

Previously, multi-material 3D printers were used to create elastic joints to connect rigid links, but did not provide for also embedding cables used for articulation of the robotic links and other components. Intricate mechanisms have been designed to route cables between systems of pulleys for cable driven robots, which require tedious assembly after fabrication. In other previous designs, the elastic elements were simply inserted into the inelastic links, which ultimately resulted in degradation of the components because the flexible and rigid parts could easily tear apart. Using 3D printed molds to create robotic features from silicone rubbers are also problematic, since using molds to create a similar platform requires a lengthier design process to include the mold geometry and an additional steps to mix, degas, pour, and cure the silicone rubber before the robot is ready to use.

Previously fabricated robots also lacked sensing capabilities and computer vision was used to track joint angles using fiducial markers placed joints. Furthermore, the actuators, which connect to the end of the cables, were designed to be detachable because the pulleys held the cables relatively tight, and the actuators would not be able to pass through the pulleys. So, the user also had to connect the actuators to the end of the routed tendons before using the robot.

The method according to the present disclosure includes initially designing a 3D model of a robot body. Any suitable computer aided design software may be used to design the 3D model. The robot body may include a plurality of components, each of which may be segmented depending on the desired material property for each components. The components may include rigid links, elastic joints, elastic pulleys, elastic cables, and sensors. Thus, the links, which are force bearing, may be formed from an inelastic material, e.g., thermoplastic polymer, while the cables that connect the links to actuators and joints which connect links to other links may be formed from an elastic material.

The design process may include initially designing the geometry of the links, followed by designing the joints that connect the links. Thereafter, pulleys are designed to hold cables close to the links. The pulley's clearance may be minimized while allowing the cable to pass through and avoid adhesion between the pulley and cable during the printing process. Printing distinct parts too close to each other can cause them to fuse. The required separation distance depends on the 3D printer. The cables are also designed to be printed as pre-routed through the pulleys.

Printed sensors include conductive traces, which are designed along the links, joints, and cables that correspond to relevant states of the robot's configuration, such as whether a link is in contact with an object, cable extension, and joint angles. These traces travel along the robotic assembly to a centralized processing unit that corresponds changes in electrical signals to the robot's configuration.

The present disclosure incorporates specific fabrication methods used to create flexible cable-driven robots to solve the interface problem of prior art 3D printed robotic assemblies with weak connection between elastic and rigid components. In embodiments, "closed chains" may be used, which are elastic joints modeled as a closed-loop to connect neighboring rigid links. In further embodiments, a ball-joint socket may also be used, which allow for cables to be inserted into a rigid link and expand inside of the link.

Once the design is finalized, a split body CAD function may be used to make hollow features in the inelastic links by removing material from overlapping elastic and conductive parts. Next, the distinct parts may be saved as separate files, e.g., stereolithography (STL) files, for use by the 3D printer. The files are then imported into a multi-material printer's dedicated software where the materials are designated, along with other 3D printing properties such as layer thickness and part orientation, etc.

After the design is completed, the 3D model may be produced by a multi-material 3D printer. Although durable adhesion between flexible and rigid materials may be difficult due to a mismatch in surface energy, the combination of multi-material printing and the two stated interface methods results in an integrated robot after a single 3D printing process. The robot may be created using any suitable multi-material 3D printer. In embodiments, a fused deposition modelling (FDM) printer may be used (e.g., Prusa i3 mk3 with multi material upgrade (MMU)), which uses a thermoplastic filament that is melted down and extruded from a print head and then is immediately set in the high temperatures of the machine and layered on a platform. Suitable polymer materials for use with FDM printers, include polylactide (PLA) for printing rigid components (inelastic), thermoplastic polyurethane (TPU) for printing elastic components, and electrically conductive composite PLA for printing sensor components.

In further embodiments, a polyjet printer (e.g., Stratasys Objet500 Connex3), which uses a carriage that jets photopolymers onto a workspace that are then cured by a UV light. For polyjet printers, acrylic photopolymer compositions may be used, e.g., Vero Pure White may be used for rigid components and Tango Black Plus for elastic components.

Once the robot is printed and support material is removed, the robotic assembly is a fully-formed, single robotic body composed of rigid links interconnected by elastic joints, cables, pulleys, which support the cables by holding them close to the links, and conductive traces. The elastic cables pass through the pulleys are pulled to move the links by bending the joints. Conductive traces are used to measure the movement of the links by tracking the joint angle, or the angle formed between two neighboring links based on the electrical resistance, since the electrical resistance corresponds to the deformation of the conductive traces, due to the robot's configuration. Actuation mechanisms may also be printed to the ends of the routed tendons, such as a pneumatic bellow, which changes length as a function of internal pressure.

According to one embodiment of the present disclosure, a robotic assembly is disclosed. The robotic assembly includes a plurality of rigid links formed from a first material and an elastic joint interconnecting a pair of rigid links of the plurality of rigid links. The elastic joint is formed from a second material. The robotic assembly also includes a conductive sensor coupled to the elastic joint and extending along at least one rigid link of the plurality of rigid links. The conductive sensor is formed from a third material. The plurality of rigid links, the elastic joint, and the conductive sensor are formed during a single printing process by a multi-material printer.

Implementations of the above embodiment may include one or more of the following features. According to one aspect of the above embodiment, the robotic assembly may further include an elastic cable coupled to a distal rigid link of the plurality of rigid links. The cable may be formed from the second material. The distal rigid link may include an internal socket therein and a distal end of the elastic cable is embedded in the internal socket during printing of the distal rigid link and the elastic cable. The robotic assembly may further include a pulley coupled to a rigid link that is proximal of the distal rigid link. The pulley may be formed from the second material. The cable is routed through the pulley. The cable may be configured to be coupled to an actuator configured to move the cable thereby moving the distal rigid link. The pulley may have a closed loop structure. At least a portion of the closed loop structure may be embedded in the link that is proximal of the distal rigid link during printing of the pulley and the link that is proximal of the distal rigid link. The conductive sensor may include a pair of conductive traces coupled to the joint and extending in a longitudinal direction along the cable. The conductive sensor may be configured to sense a change in resistance in response to flexing of the pair of conductive traces. The elastic joint may also have a closed loop structure. At least a portion of the closed loop structure may be embedded in each rigid link of the pair of rigid links during printing of the elastic joint and the pair of rigid links. The first material may be a rigid polymeric material at room temperature and may include at least one of acrylonitrile butadiene styrene, polylactide, thermoplastic polyurethane, polyethylene terephthalate glycol, or polyetherimide. The second material may be an elastic polymeric material at room temperature and may include thermoplastic polyurethane. The third material may be an electrically conductive polymer and may include polylactide or thermoplastic polyurethane.

According to another embodiment of the present disclosure, a method for fabricating a robotic assembly is disclosed. The method includes receiving a design file at a multi-material modelling printer. The design file may include instructions for printing a robotic assembly having a plurality of rigid links formed from a first material. The robotic assembly also includes an elastic joint interconnecting a pair of rigid links of the plurality of rigid links. The elastic joint formed from a second material and a conductive sensor coupled to the elastic joint and extending along at least one rigid link of the plurality of rigid links. The conductive sensor is formed from a third material. The method also includes printing the plurality of rigid links, the elastic joint, and the conductive sensor during a single printing process.

Implementations of the above embodiment may include one or more of the following features. According to one aspect of the above embodiment, the design file may also include instructions for printing an elastic cable coupled to a distal rigid link of the plurality of rigid links. The cable may be formed from the second material. The design file may also include instructions for printing an internal socket defined in the distal rigid link and a distal end of the elastic cable is embedded in the internal socket during printing of the distal rigid link and the elastic cable. The design file may also include instructions for printing pulley coupled to a rigid link that is proximal of the distal rigid link. The pulley may be formed from the second material. The method may further include printing the elastic cable and the pulley during the single printing process. The first material may be a rigid polymeric material at room temperature and may include at least one of acrylonitrile butadiene styrene, polylactide, thermoplastic polyurethane, polyethylene terephthalate glycol, or polyetherimide. The second material may be an elastic polymeric material at room temperature and may include thermoplastic polyurethane. The third material may be an electrically conductive polymer and may include polylactide.

BRIEF DESCRIPTION OF DRAWINGS

Various embodiments of the present disclosure are described herein below with reference to the figures wherein.

DETAILED DESCRIPTION

Figure 1:
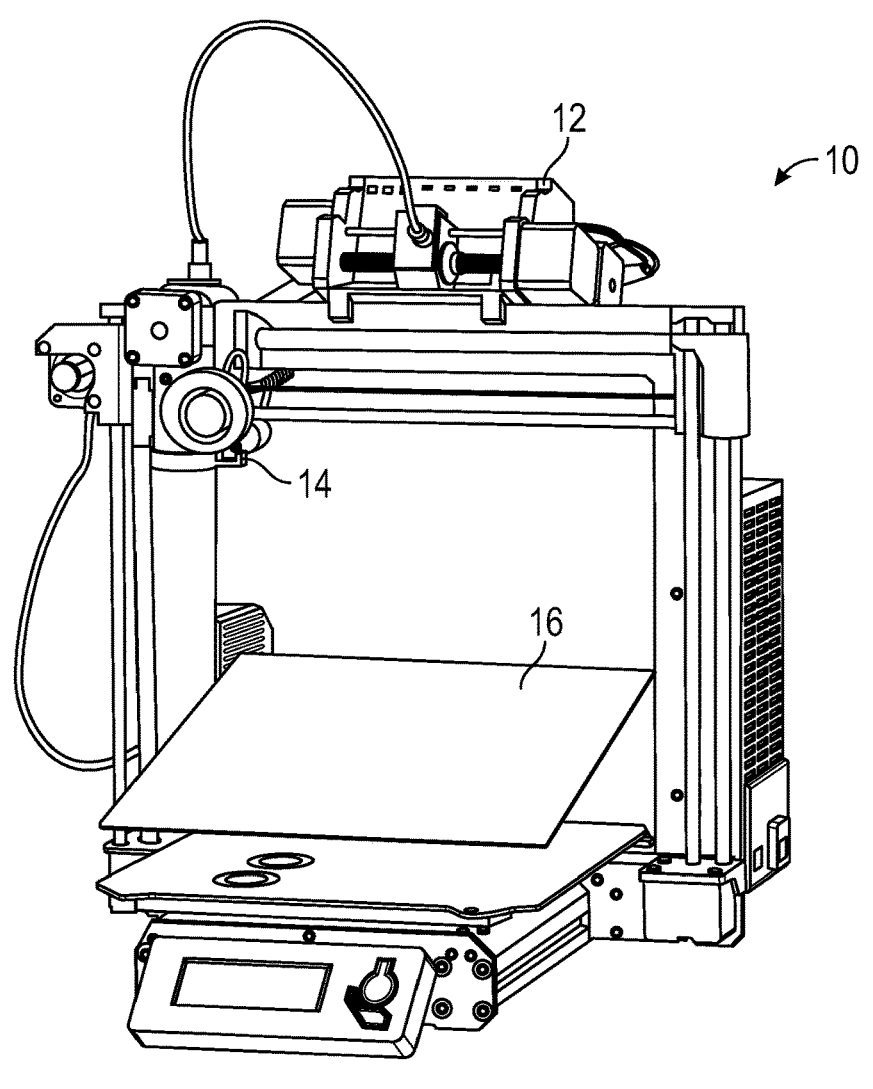
FIG. 1 is a perspective view of a multi-material 3D printer for use with the present disclosure.

Embodiments of the presently disclosed assembly are described in detail with reference to the drawings, in which like reference numerals designate identical or corresponding elements in each of the several views. As used herein the term "distal" refers to the portion of the robotic assembly that is closer to an end effector of the robotic assembly, while the term "proximal" refers to the portion that is farther from the end effector.

With reference to FIG. 1, a multi-material 3D printer 10 may be used to fabricate a robotic assembly 20 (FIGS. 2-4) according to the present disclosure. The printer 10 may be any suitable additive fabrication printer, such as an FDM printer or a polyjet printer. The printer 10 may include a carriage 12 configured to provide a plurality of materials for forming the robotic assembly 20. The materials may include any suitable thermoplastic polymers including, but not limited to, acrylonitrile butadiene styrene (ABS), polylactide (PLA), thermoplastic polyurethane (TPU), polyethylene terephthalate glycol (PETG), polyetherimide (PEI), and the like. The materials may be stored as spools and provided to the carriage 12 for feeding to a heated nozzle 14, which extrudes the filaments, and applying the extruded material layer by layer to a heated platform 16 to build the robotic assembly 20. The printer 10 is configured to support at least three materials: a first material to print rigid components, a second material to print elastic components, and a third to print conductive traces for sensing components.

In embodiments, flexibility of the robotic assembly 20 may be achieved through material properties or through geometry. In particular, the same elastic material may be used for the first and second material, the geometry of the printed components may be used to vary the stiffness. This may be suitable since certain FDM multi-material printers may have a difficult time supporting the transition between PLA and TPU.

Figure 2:
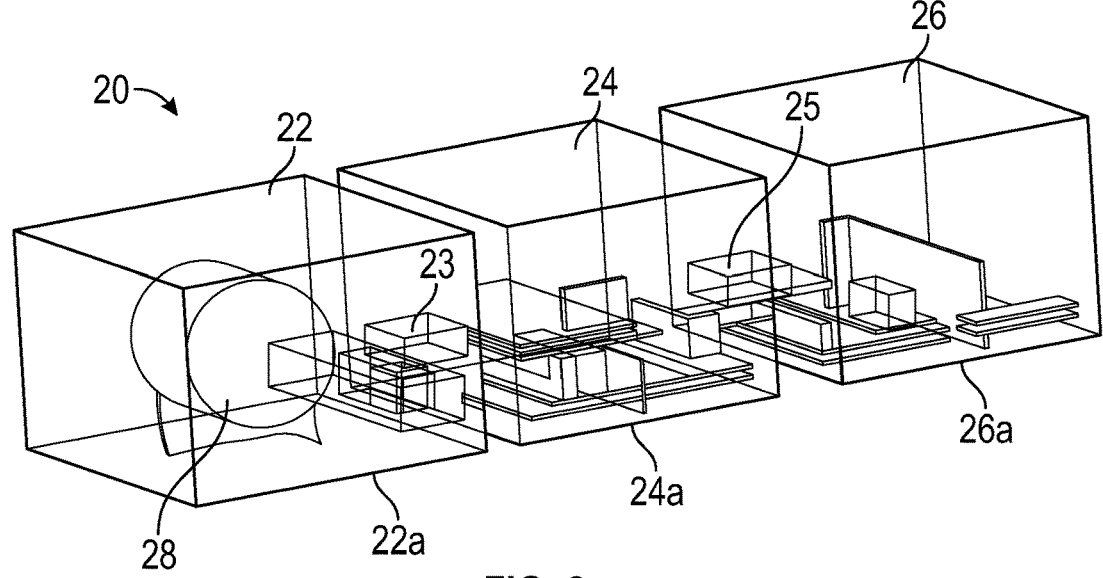
FIG. 2 is a perspective, partially transparent view of a robotic assembly according to the present disclosure.
Figures 3, 4:
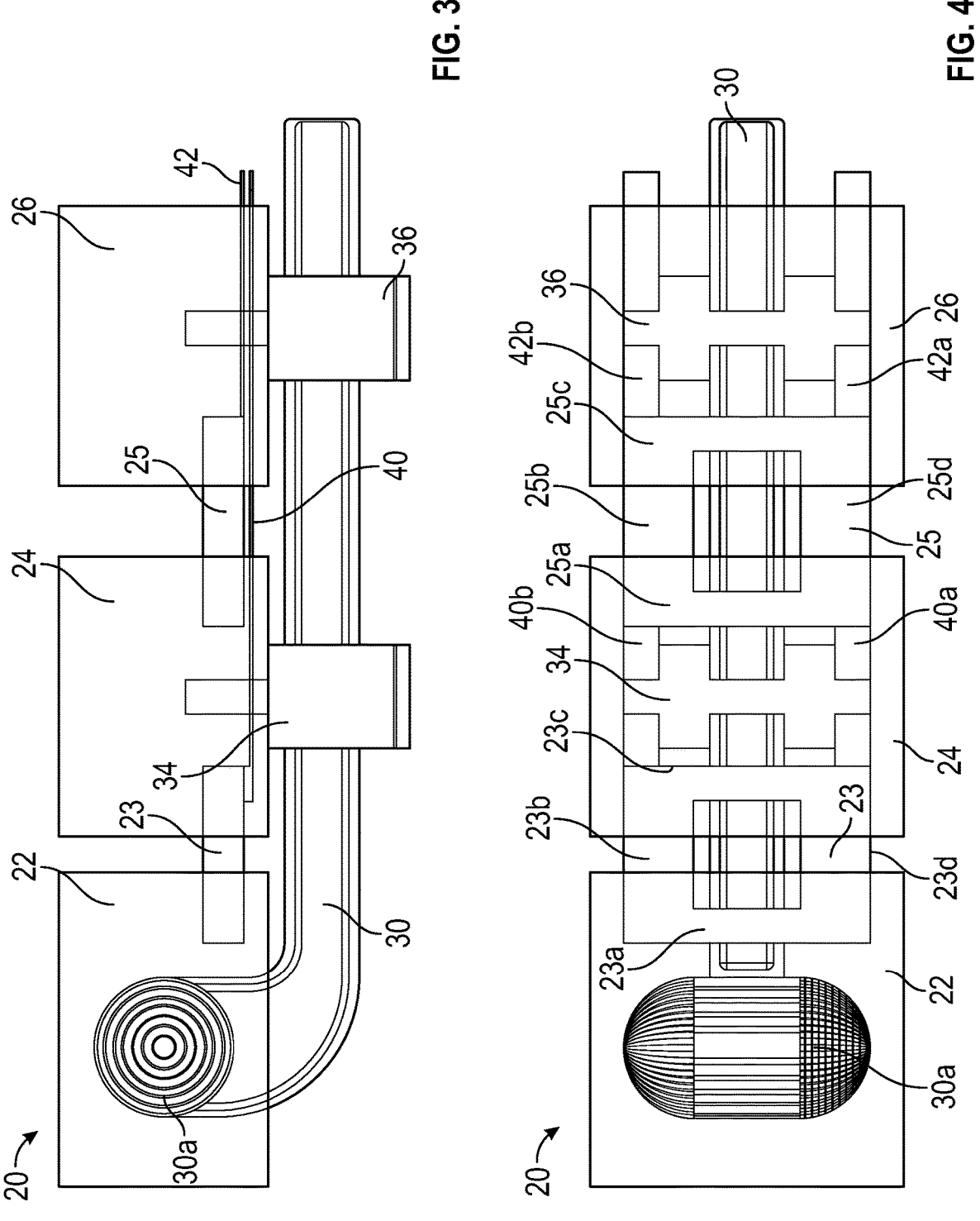
FIG. 3 is a side, partially transparent view of the robotic assembly of FIG. 2 according to the present disclosure.
FIG. 4 is a top, partially transparent view of the robotic assembly of FIG. 2 according to the present disclosure.

With reference to FIGS. 2-4, the robotic assembly 20 includes a plurality of rigid links, namely, a distal rigid link 22, a middle rigid link 24, and a proximal rigid link 26. The robotic assembly 20 also includes a distal elastic joint 23 interposed between the links 22 and 24 and a proximal elastic joint 25 interposed between the links 24 and 26. The links 22, 24, 26 may be formed from any suitable thermoplastic polymer that forms a rigid material at room temperature, which denotes a temperature from about 20° C. to about 25° C., such as ABS, PLA, PETG, PEI, etc. The elastic joints 23 and 25 may be formed from any suitable elastomeric polymer that forms an elastic material at room temperature, such as TPU.

The elastic joints 23 and 25 are partially embedded in the links 22, 24, 26 and may have any suitable shape and a unitary, i.e., closed loop, structure, such as a rectangle, with two parallel sides being embedded in the interconnected links. In particular, the elastic joint 23 includes four sides 23a, 23b, 23c, 23d, which two parallel sides 23a and 23c being embedded in the distal and middle links 22 and 24, respectively. Thus, the sides 23b and 23d are disposed in parallel with a longitudinal axis defined by the robotic assembly 20 and are located outside the links 22 and 24 allowing for flexing of the elastic joint 23. In the same manner, the elastic joint 25 also includes four sides 25a, 25b, 25c, 25d, which two parallel sides 25a and 25c being embedded in the middle link 24 and the proximal link 26, respectively, while the sides 25b and 25d are outside the links 24 and 26 and allow for flexing of the elastic joint 25. In embodiments, the elastic joints 23 and 25 may include one or more strips, i.e., open chain, interconnecting the links 22, 24, 26. However, a closed chain structure provides additional structural integrity for the joints 23 and 25 by embedding a larger portion of the joints 23 and 25 in the links 22, 24, 26.

The distal link 22 includes a socket 28 configured to secure a distal end 30a (FIG. 2) of an elastic cable 30 therein. In embodiments, a plurality of cables may be attached to one or more of the links 22, 24, 26 to allow for multi-directional articulation of the robotic assembly 20. The distal end 30a is embedded in the socket 28 during the manufacturing process. The socket 28 may be larger, e.g., wider, than the cable, to allow for an increased contact area between the socket 28 and the distal end 30a.

Each of the middle link 24 and the proximal link 26 is also coupled to an elastic pulley 34 and 36, respectively. The cable 30 extends from an opening 29 defined in a surface 22a (FIG. 2) of the distal link 22. The cable 30 then passes through each of the pulleys 34 and 36, which extend from the surfaces 24a and 26a of the middle link 24 and the proximal link 26, respectively (FIG. 2). The surfaces 22a, 24a, 26a, are aligned approximately along the same plane such that the cable 30 can travel in a longitudinal direction unobstructed.

The pulleys 34 and 36 may have any suitable shape that defines an opening therethrough to allow for routing of the cable 30, e.g., a rectangular frame, similar to the shape of the joints 23 and 25. The pulleys 34 and 36 may be attached to their respective middle link 24 and proximal link 26 by embedding a portion of the middle link 24 and proximal link 26 during the manufacturing process in a similar manner as the joints 23 and 25. The cable 30 and the pulleys 34 and 36 may also be formed from any suitable elastomeric polymer that forms an elastic material at room temperature, such as TPU.

The robotic assembly 20 also includes conductive sensors 40 and 42. The first conductive sensor 40 includes a pair of conductive traces 40a and 40b and the second conductive sensor 42 also includes a pair of conductive traces 42a and 42b. The first pair of conductive traces 40a and 40b are disposed distally of the second pair of conductive traces 42a and 42b. In particular, the first pair of conductive traces 40a and 40b are coupled to the distal joint 23 and extend in substantially parallel manner through the middle link 24 and along the proximal joint 25 and through the proximal link 26. The second pair of conductive traces 42*a* and 42*b* are coupled to the proximal joint 25 and extend in substantially parallel manner through the proximal link 26. The first pair of conductive traces 40*a* and 40*b* and the second pair of conductive traces 42*a* and 42*b* may be formed from any suitable electrically conductive polymer that forms a flexible material at room temperature, such an electrically conductive PLA.

Each of the conductive sensors 40 and 42, i.e., the first pair of conductive traces 40*a* and 40*b* and the second pair of conductive traces 42*a* and 42*b* may be coupled to a controller (not shown) configured to measure a change in electrical resistance of the conductive sensors. Since the conductive traces 40*a*, 40*b*, 42*a*, 42*b* are designed to be placed along their respective links 24, 26, joints 23, 25, and the cable 30, as these components are moved, i.e., articulated, the conductive traces 40*a*, 40*b*, 42*a*, 42*b* are bent or flexed accordingly, which results in a change of the resistance of the conductive sensors 40 and 42. The controller continuously monitors the resistance of the conductive sensors 40 and 42 and determines corresponding relevant states of the configuration of the robotic assembly 20, i.e., whether the robotic assembly 20 is in contact with an object, extension of the cable 30, and angles between the links 22, 24, 26, etc.

Figure 5:
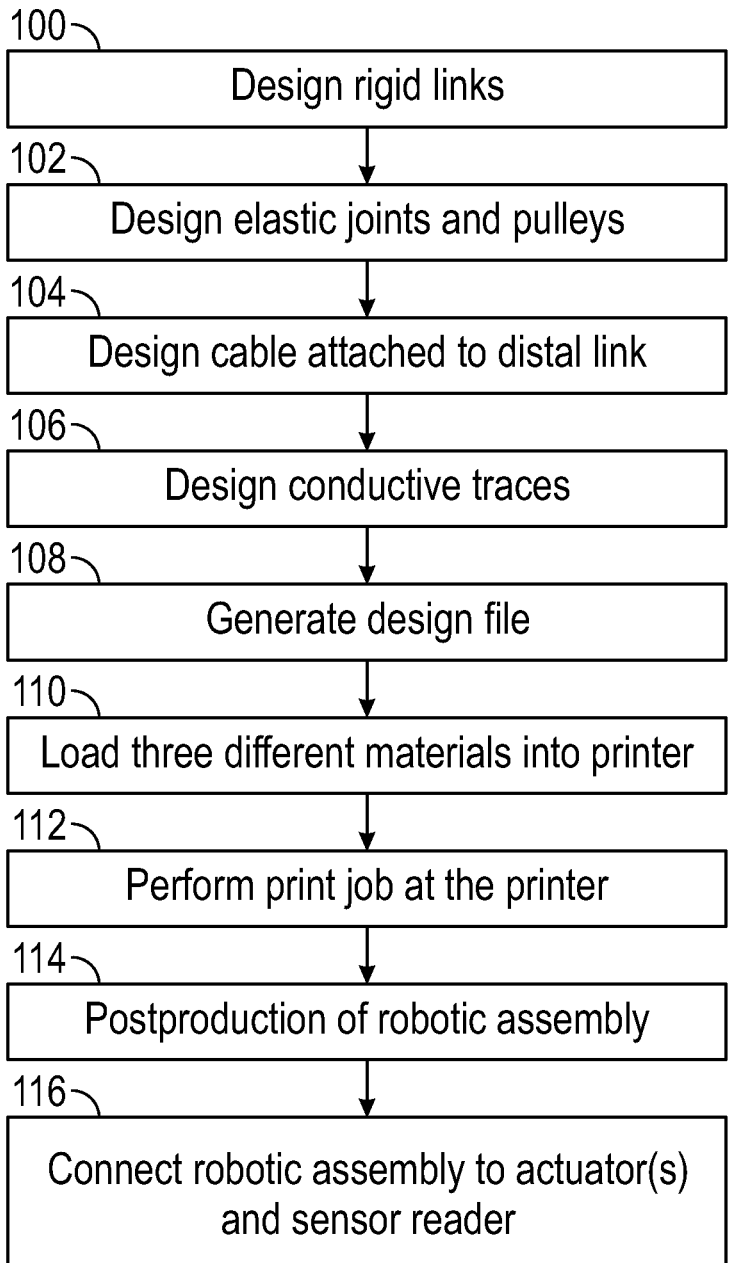
FIG. 5 is a method of manufacture of the robotic assembly of FIG. 2 according to the present disclosure.

With reference to FIG. 5 a flow chart of a method for designing and fabricating the robotic assembly 20 includes designating the geometry of the rigid components of the robotic assembly 20, i.e., links 22, 24, 26, at step 100. This step may be performed using any suitable 3D CAD software that allows for creating virtual models of components. At step 102, elastic components, i.e., joints 23 and 25 and pulleys 34 and 36, are designed and are virtually attached to the links 22, 24, 26. The pulleys 34 and 36 are designed to hold the cable 30 close to the links 22, 24, 26 within minimal clearance while allowing for the cable 30 to pass through the pulleys 34 and 36 and avoiding adhesion between the cable 30 and the pulleys 34 and 36 during printing. Printing distinct parts too close to each other may cause them to fuse. The separation distance may be adjusted based on the parameters of the printer 10. At step 104, the cable 30 is designed to be attached to the socket 28 at the distal end 30*a*. In embodiments, the cable 30 may be designed to be pre-routed through the pulleys 34 and 36 or to be attached only to the distal link 22 for later manual routing. The elastic components may be designed in any order, depending on the needs of the robotic designer, and the sequence of steps of the method of FIG. 5 is not intended to be limiting, but is merely illustrative. At step 106, the conductive traces 40*a*, 40*b*, 42*a*, 42*b* are designed to be coupled to the proximal and distal joints 23 and 25, respectively, and to be routed along their respective links 24, 26, joints 23, 25, and the cable 30.

After the design is complete, at step 108, one or more design files containing instructions, i.e., slices, for the printer 10 to print the robotic assembly 20 is generated. At step 110, the printer 10 is loaded with three different materials, namely, a first material for printing rigid components, i.e., the links 22, 24, 26, a second material printing elastic components, i.e., joints 23, 25, cable 30, and pulleys 34 and 36, and a third material for printing electrical components, i.e., the conductive traces 40*a*, 40*b*, 42*a*, 42*b*. In embodiments, other types of components beyond the three disclosed herein may also be incorporated into the robotic assembly 20 using other types of material, i.e., semiflexible polymers.

At step 112, the printer 10 performs the print job to fabricate the robotic assembly 20 using the design file. At step 114, postproduction of the robotic assembly 20 may be performed to clean up supports and route the cable 30. At step 116, the cable 30 is connected to an actuator (not shown), e.g., bellows, and the conductive traces 40*a*, 40*b*, 42*a*, 42*b* are connected to the controller, thereby allowing for use of the robotic assembly 20, including monitoring the articulation of the robotic assembly 20 and controlling the robotic assembly 20 based on the feedback from the conductive sensors 40 and 42.

The following Examples illustrate embodiments of the present disclosure. These Examples are intended to be illustrative only and are not intended to limit the scope of the present disclosure.

EXAMPLE 1

This Example describes design and fabrication of an exemplary robotic assembly according to the present disclosure.

Figure 6A:
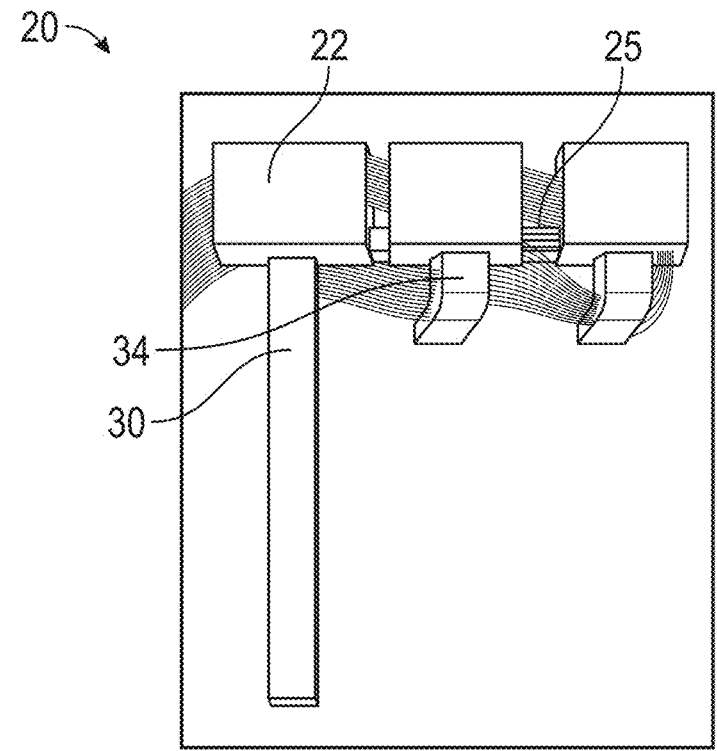
FIGS. 6A and B show photographs of a robotic assembly manufactured using the method of FIG. 5 according to the present disclosure.
Figure 6B:
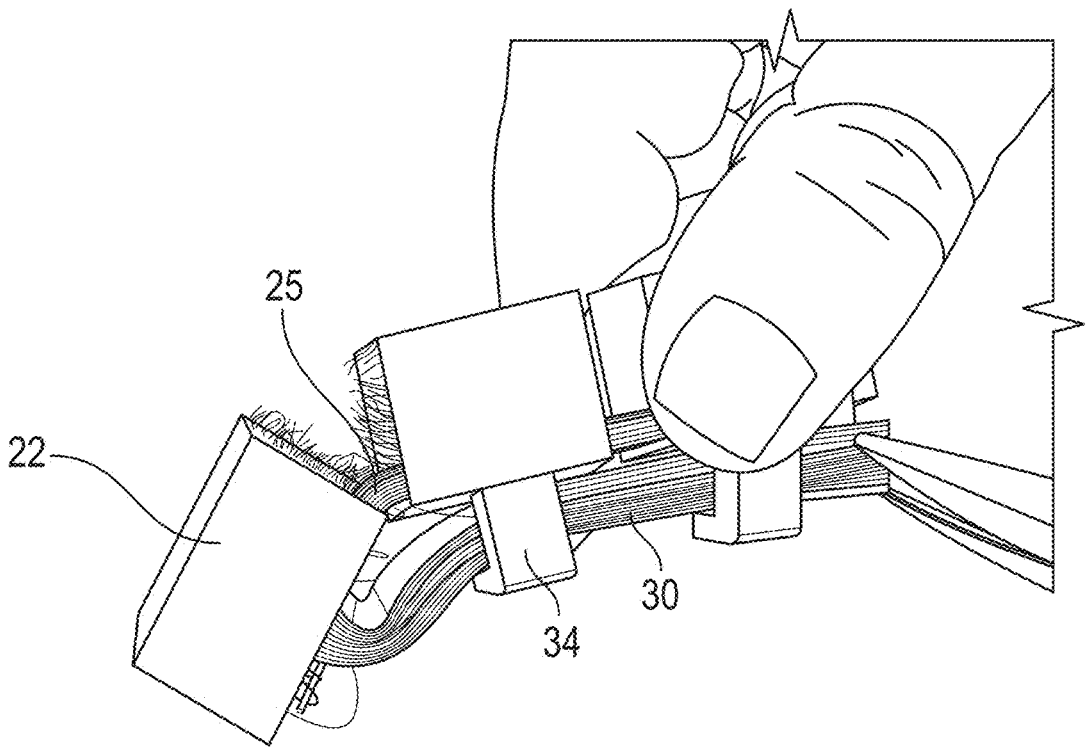

An FDM printer Prusa i3 mk3 with MMU loaded with PLA and TPU was used to print a robotic assembly designed using the method according to the present disclosure. FIGS. 6A and B show the robotic assembly printed by the Prusa printer incorporating two distinct materials in a single printing process, thus, resulting in a complete robotic assembly. All the components were attached to each other and did not require further assembly. As shown in FIG. 6A, a cable disposed within a socket of a distal rigid link was initially printed in an unrouted configuration and was then routed through two pulleys as shown in FIG. 6B.

It will be appreciated that of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims. Unless specifically recited in a claim, steps or components according to claims should not be implied or imported from the specification or any other claims as to any particular order, number, position, size, shape, angle, or material.

What is claimed is:

1. A robotic assembly comprising:

a plurality of rigid links formed from a first material;

an elastic joint interconnecting a pair of rigid links of the plurality of rigid links, the elastic joint formed from a second material;

a conductive sensor coupled to the elastic joint and extending along at least one rigid link of the plurality of rigid links, the conductive sensor formed from a third material, wherein the plurality of rigid links, the elastic joint, and the conductive sensor are formed during a single printing process by a multi-material printer; and an elastic cable coupled to a distal rigid link of the plurality of rigid links, the elastic cable formed from the second material.

2. The robotic assembly according to claim 1, wherein the distal rigid link includes an internal socket therein and a distal end of the elastic cable is embedded in the internal socket during printing of the distal rigid link and the elastic cable.

3. The robotic assembly according to claim 1, wherein the first material is a rigid polymeric material at room temperature and includes at least one of acrylonitrile butadiene styrene, polylactide, thermoplastic polyurethane, polyethylene terephthalate glycol, or polyetherimide.

4. The robotic assembly according to claim 1, wherein the second material is an elastic polymeric material at room temperature and includes thermoplastic polyurethane.

5. The robotic assembly according to claim 1, wherein the third material is an electrically conductive polymer and includes polylactide.

6. The robotic assembly according to claim 1, wherein the elastic joint has a closed loop structure.

7. The robotic assembly according to claim 6, wherein at least a portion of the closed loop structure is embedded in each rigid link of the pair of rigid links during printing of the elastic joint and the pair of rigid links.

8. The robotic assembly according to claim 1, wherein the conductive sensor includes a pair of conductive traces coupled to the elastic joint and extending in a longitudinal direction along the elastic cable.

9. The robotic assembly according to claim 8, wherein the conductive sensor is configured to sense a change in resistance in response to flexing of the pair of conductive traces.

10. The robotic assembly according to claim 1, further comprising:
   a pulley coupled to a rigid link that is proximal of the distal rigid link, the pulley formed from the second material.

11. The robotic assembly according to claim 10, wherein the elastic cable is routed through the pulley.

12. The robotic assembly according to claim 11, wherein the elastic cable is configured to be coupled to an actuator configured to move the elastic cable thereby moving the distal rigid link.

13. The robotic assembly according to claim 10, wherein the pulley has a closed loop structure.

14. The robotic assembly according to claim 13, wherein at least a portion of the closed loop structure is embedded in the rigid link that is proximal of the distal rigid link during printing of the pulley and the rigid link that is proximal of the distal rigid link.

15. A method for fabricating a robotic assembly, the method comprising:
   receiving a design file at a multi-material printer, the design file including instructions for printing a robotic assembly including:
      a plurality of rigid links formed from a first material;
      an elastic joint interconnecting a pair of rigid links of the plurality of rigid links, the elastic joint formed from a second material;

a conductive sensor coupled to the elastic joint and extending along at least one rigid link of the plurality of rigid links, the conductive sensor formed from a third material; and
      an elastic cable coupled to a distal rigid link of the plurality of rigid links, the elastic cable formed from the second material and having an internal socket defined therein;
   printing the plurality of rigid links, the elastic joint, and the conductive sensor during a single printing process, wherein a distal end of the elastic cable is embedded in the internal socket during printing of the distal rigid link and the elastic cable.

16. The method according to claim 15, wherein the design file includes instructions for printing:
   a pulley coupled to a rigid link that is proximal of the distal rigid link, the pulley formed from the second material.

17. The method according to claim 16, further comprising:
   printing the elastic cable and the pulley during the single printing process.

18. The method according to claim 16, wherein the first material is a rigid polymeric material at room temperature and includes at least one of acrylonitrile butadiene styrene, polylactide, thermoplastic polyurethane, polyethylene terephthalate glycol, or polyetherimide;
   the second material is an elastic polymeric material at room temperature and includes thermoplastic polyurethane; and
   the third material is an electrically conductive polymer and includes polylactide.

19. A robotic assembly comprising:
   a plurality of rigid links formed from a first material;
   an elastic joint having a closed loop structure interconnecting a pair of rigid links of the plurality of rigid links, the elastic joint formed from a second material; and
   a conductive sensor coupled to the elastic joint and extending along at least one rigid link of the plurality of rigid links, the conductive sensor formed from a third material, wherein the plurality of rigid links, the elastic joint, and the conductive sensor are formed during a single printing process by a multi-material printer.

20. The robotic assembly according to claim 19, wherein at least a portion of the closed loop structure is embedded in each rigid link of the pair of rigid links during printing of the elastic joint and the pair of rigid links.

* * * * *